United States Patent [19]

Ferro

[11] 4,016,235
[45] Apr. 5, 1977

[54] METHOD OF MAKING SIMULATED STAINED GLASS FROM MOLDABLE PLASTIC MATERIAL

[75] Inventor: William P. Ferro, Bayside, Wis.

[73] Assignee: KCS Industries, Inc., Milwaukee, Wis.

[22] Filed: Dec. 23, 1974

[21] Appl. No.: 536,921

[52] U.S. Cl. .............................. 264/132; 264/135; 264/251; 264/254; 264/255; 264/259; 264/266; 264/275; 264/279; 264/328

[51] Int. Cl.² .................. B29C 9/00; B29D 17/04; B29D 9/00

[58] Field of Search .................. 264/219, 245–247, 264/1, 132, 134, 135, 214, 219, 250, 254, 255, 259, 296, 320, 275

[56] References Cited

UNITED STATES PATENTS 3,122,598   2/1964   Berger ............................. 264/247
3,769,114   10/1973  Weigert ........................... 264/227

FOREIGN PATENTS OR APPLICATIONS 2,049,361   1971   France ............................ 264/247
46-19880    1971   Japan ............................. 264/247

*Primary Examiner*—Willard E. Hoag
*Attorney, Agent, or Firm*—Andrus, Sceales, Starke & Sawall

[57] ABSTRACT

A method of making simulated stained glass from moldable plastic material. One wall of a die is formed with a series of interconnected recesses which border isolated areas, and the isolated areas of the die are provided with random surface indentations. A sheet of plastic film having a series of dark colored interconnected strips, corresponding in configuration to the recesses in the die, and having a series of light colored zones of the same configuration as the isolated areas of the die, is disposed on the die surface with the dark colored strips in precise registry with the recesses of the die and the light colored zones in registry with the isolated areas of the die. The plastic film is held against the die surface by a vacuum, and a liquid thermoplastic resin is injected into the die cavity. The plastic film deforms under the heat and pressure to depress the dark colored strips of the film into the die recesses and the thermoplastic resin fuses to the plastic film to provide a simulated stained glass having raised dark colored strips corresponding to the leaded strips of stained glass, and having light colored areas corresponding to the panes of glass.

8 Claims, 6 Drawing Figures

U.S. Patent April 5, 1977 4,016,235
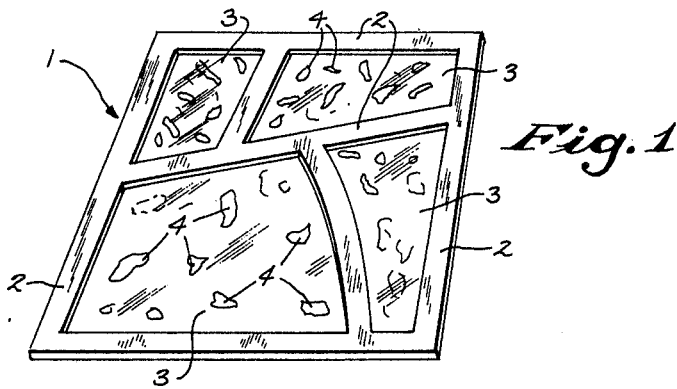
Fig.1
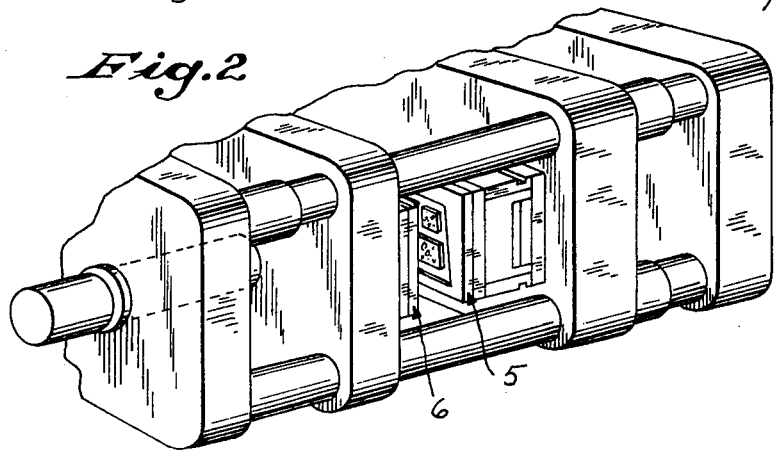
Fig.2
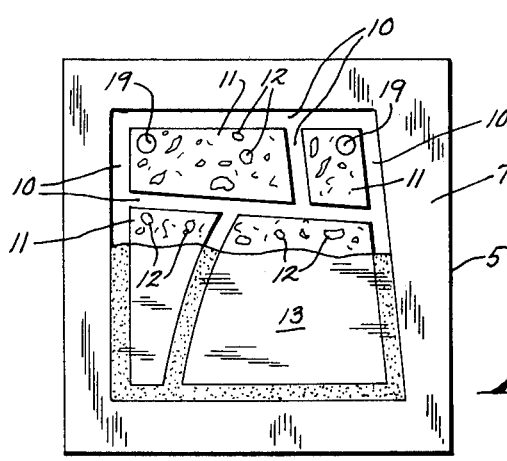
Fig.4
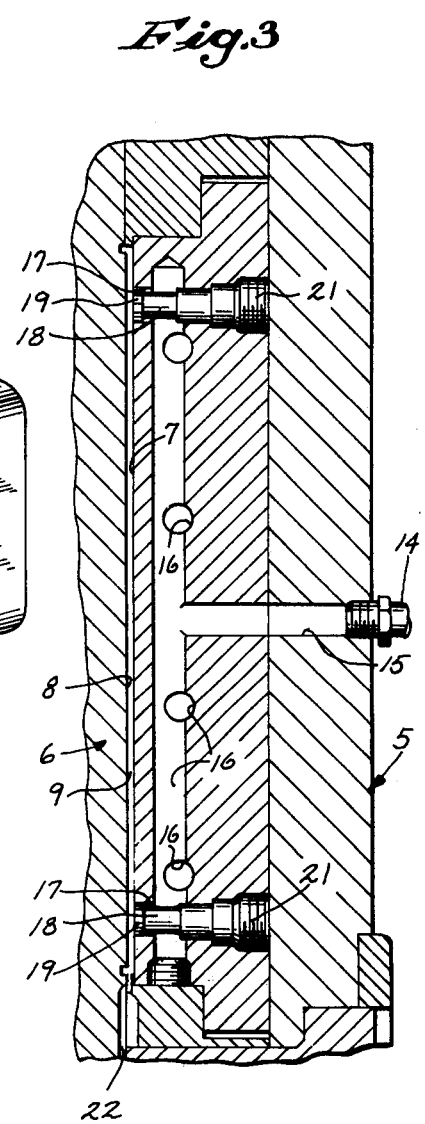
Fig.3
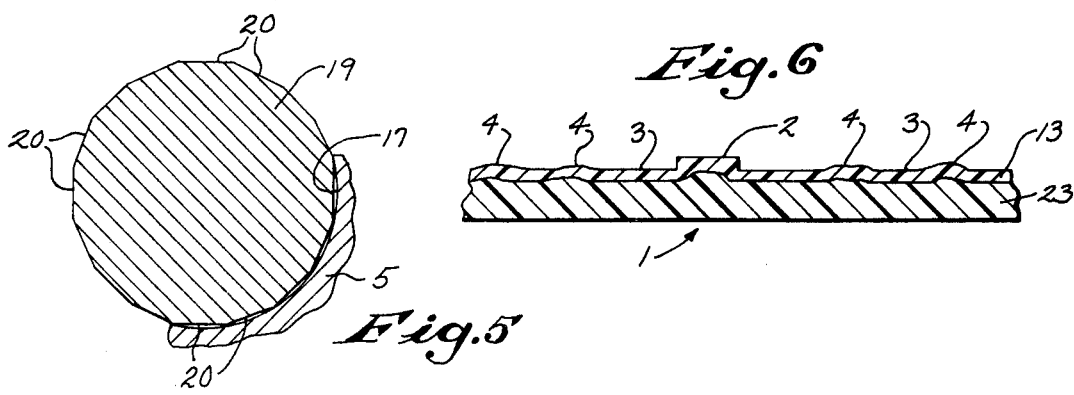
Fig.5
Fig.6

METHOD OF MAKING SIMULATED STAINED GLASS FROM MOLDABLE PLASTIC MATERIAL

BACKGROUND OF THE INVENTION

Stained glass which is made by highly skilled craftsmen, consists of small colored glass panes interconnected by leaded strips. Because of the great skill and the time required to produce stained glass, it is costly and is only used in special situations.

It is often desirable to have simulated stained glass made of plastic materials for use in advertising displays, or for decorative panels. To render the simulated stained glass more authentic in appearance, the simulated stained glass should have relief, meaning that portions of the article representing the leaded strips of stained glass should be raised with respect to the areas representing the glass panes, and the areas representing the glass panes should also have relief to represent the irregular type of glass panes normally used in authentic stained glass.

SUMMARY OF THE INVENTION

The invention is directed to a method of making simulated stained glass having relief by an injection molding procedure using moldable plastic materials. In accordance with the method of the invention, at least one wall of the injection molding die is formed with a series of interconnected recesses or grooves which border isolated areas, and the isolated areas of the die are provided with random surface indentations.

In making the simulated stained glass, a sheet of plastic film having a series of dark-colored interconnected strips or lines, corresponding to the configuration of the recesses in the die, and having a series of light colored zones of the same configuraton as the isolated areas of the die, is disposed on the die surface. The dark-colored strips are placed in precise registry with the recesses of the die and the zones in registry with the isolated areas of the die.

The film is held firmly against the die surface by use of a vacuum, and the liquid moldable plastic resin is then injected into the die cavity. The heat and pressure of the resin acts to mold the dark-colored strips into the recesses, and the resin will fuse to the surface of the plastic film to provide a composite structure. The resulting molded structure resembles stained glass, having raised dark colored strips, corresponding to the leaded strips of stained glass, and having light colored areas in relief bordered by the strips, corresponding to the glass panes.

The process of the invention produces an authentic-appearing simulated stained glass by an inexpensive injection molding process. the simulated stained glass can be used in advertising displays, or lighting fixtures, or used as decorative panels.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of simulated stained glass panel prepared by the method of the invention;

FIG. 2 is a fragmentary perspective view of a standard injection molding press of the horizontal type which can be used to fabricate the simulated glass panels of the invention;

FIG. 3 is an enlarged fragmentary cross sectional view of the press;

FIG. 4 is a plan view of the die cavity with the plastic film positioned therein;

FIG. 5 is an enlarged sectional view of one of the restricted inlets connected to the vacuum conduit; and FIG. 6 is an enlarged fragmentary cross-sectional view of the panel shown in FIG. 1, with relief only on one surface.

DESCRIPTION OF THE PREFERRED EMBODIMENT

FIG. 1 illustrates a simulated stained glass panel 1 prepared by the method of the invention. The panel 1 includes a series of raised dark-colored strips 2 which border isolated light-colored panes or areas 3. The panes 3 are provided with a series of randomly disposed surface irregularities 4 giving the panes the appearance of etched or matte finish glass. The strips 2 correspond to the leaded strips of stained glass while the light colored panes 3 represent the glass panes in stained glass.

The panel is produced through use of an injection molding machine of a standard type, such as that shown in U.S. Pat. Nos. 3,270,101 and 3,424,827 and no detailed description will be given of the injection molding machine. Preferably, the press is the injection molding machine is of the horizontal type with the mold plates, blocks or inserts arranged vertically. As shown in FIGS. 2 and 3, the injection molding machine includes a fixed die member or block 5 and a movable die member 6. Die member 5 is provided with a die surface 7 which faces the die surface 8 of the movable die 6 and the surfaces 7 and 8 define a die cavity 9 when the movable die 6 is in the closed position.

In accordance with the invention, the die surface 7 is provided with a series of narrow recesses or grooves 10 which border or define isolated areas 11. The isolated areas 11 are formed with a series of randomly disposed surface indentations 12.

In forming the panel 1, a thin sheet of polymeric film 13 is placed on the die surface 7 of die member 5. The polymeric film is formed of a thermoplastic resin, such as a polyolefin, including polyethylene and polypropylene; polystyrene; polycarbonate; polyvinylchloride; ABS resins (acrylonitrile-butadiene-styrene copolymers); and the like. The polymeric film 13 has a thickness in the range of 3 to 11 mils, and preferably in the range of 4 to 6 mils.

A coloring pattern is applied to one surface of the film 13 using conventional heat resistant inks, and offset printing, silk screening, gravure, or other well known methods of applying multi-colored inks to the surface of such film can be employed to impart the coloring pattern on the film. The coloring pattern or printing consists of a series of interconnected, dark-colored strips or lines, such as black strips, which are identical in configuration to the recesses 10 in the die surface 7. The coloring pattern also includes light colored zones or areas bordered by the dark colored strips, corresponding in size and configuration to the areas 11 of the die surface 7.

The film 13 is placed on the die surface 7 with the dark colored strips in precise registry with the recesses 10 and the light colored zones in precise registry with the isolated areas 11 of the die surface 7. Precise registry can be obtained by die cutting the film to the dimensions of the die cavity 9.

During the molding procedure, a liquid thermoplastic resin, which is compatible with the resin of the film 13, is injected under pressure into the die cavity 9 and it is necessary to hold the plastic film 13 firmly against the die surface 7 during the molding operation. As illustrated in the drawings, a vacuum system is utilized to hold the film 13 against the die surface but other holding means, such as an electrostatic charge, locking pins, or the like can be utilized to hold the film 13 against the die surface while the resin is injected into the die cavity.

With the vacuum method of holding, as illustrated in the drawings, a conduit 14 is connected between a suitable source of vacuum or subatmospheric pressure and a manifold 15 in the die member 5. Manifold 15 in turn is connected to a series of passages 16 which communicate with ports 17 in the die surface 7. The number of ports 17 is generally determined by the size of the die member 5, and in the embodiment shown, there are four ports 17 located in the corners of the rectangular die cavity.

To prevent the liquid thermoplastic resin, which is injected into the cavity 9, from entering the vacuum system, the ports 17 are enclosed by plugs or pins 18, each having a head 19 formed with a series of flat surfaces 20. Flat surfaces 20 cooperate with the circular bore of the port 17 to provide orifices of restricted size, thereby preventing any liquid thermoplastic resin which may inadvertently get behind the film 13 from entering and clogging the vacuum system.

The pins 18 are maintained in position with respect to the ports 17 by threaded engagement of the end 21 of the pin with a threaded bore in the die member 5.

Certain thermoplastic resin films, such as polystyrene, are biaxially oriented, and when heated, the film will tend to shrink. The use of the vacuum is important in holding the film tightly against the die surface 7 to prevent shrinkage and maintain precise registry of the printing with the recesses 10 and isolated areas 11 of the die surface.

During the molding operation, liquid thermoplastic resin is injected into the mold cavity 9 through the inlet 22, and during the molding operation the heat and pressure of the resin layer 23 will act to deform or mold the film 13, causing the dark colored strips of the film to be depressed into the recesses 10 and causing the light colored areas of the film to conform to the surface indentations 11 or engraved regions in the areas 11 of the die surface 7.

The layer of liquid thermoplastic resin 23, being compatible with the material of the film 13, will fuse or bond to the outer surface of the film 13 thereby providing a composite structure of the desired thickness. The completed product, as shown in FIG. 1, includes raised dark colored strips 2 bordering the light colored panes 3. The panes have an irregular appearance caused by the random indentations 12 in the die surface 7, and this relief in the panes 3 results in substantial light defraction making the panes more nearly resemble the type of glass normally used in making stained glass.

If desired, after the molding operation is completed, the strips 2 can be rendered completely opaque by imparting color to the strips by means of hot stamping or other conventional printing operations.

While the above description has shown the recesses 10 and surface indentations 12 being applied only to the surface 7 of the die, it is contemplated that cooperating recesses and surface indentations may be applied to the surface 8 of the die member 6, in which case both surfaces of the panel 1 will be provided with the desired relief.

The printed surface of the film 13 can either be placed against the die surface 7, or alternately, it can be placed away from the die surface. The injected thermoplastic resin is transparent, so that the printed pattern will appear on both sides of the molded panel regardless of whether the printing faces toward or away from the die surface 7.

The process of the invention produces an authentic-appearing simulated stained glass article by an inexpensive injection molding process. The panel has raised dark colored strips, corresponding to the leaded strips of stained glass, and has light colored areas bordered by the dark strips which represent the glass panes. The simulated stainless glass can be used in advertising displays, lighting fixtures, decorative wall panels, room dividers, and the like.

Various modes of carrying out the invention are contemplated as being within the scope of the following claims particularly pointing out and distinctly claiming the subject matter which is regarded as the invention.

I claim:

1. A process for forming a simulated stained glass article, comprising the steps of providing an injection molding die having a die cavity bordered by a die member, forming a series of interconnected recesses in a surface of the die member with said recesses bordering isolated areas of said surface, forming a series of randomly disposed surface indentations in said isolated areas, coating a series of colored interconnected strips on a surface of a thin plastic sheet with said strips having the same configuration as said recesses, said strips bordering colored isolated zones having the same configuration as said areas and having a different color than said strips, positioning said sheet on said surface of the die member and registering said strips with said recesses and registering said zones with said areas, holding the sheet against the die member, injecting under pressure into said cavity a heated liquid resin compatible with said sheet, said sheet softening and deforming under said heat and pressure to deform the strips into the corresponding recesses and to deform said zones into the surface indentations of the corresponding areas, and fusing the resin to said sheet to provide a simulated stained glass article having raised colored strips bordering different colored areas.

2. The method of claim 1, wherein the dark colored strips and the light colored zones are applied to the sheet by printing.

3. The method of claim 1, wherein the sheet has a thickness in the range of 3 to 11 mils.

4. The method of claim 1, wherein the surface indentations are formed with a lesser depth than said recesses.

5. The method of holding the sheet against the die surface is accomplished by subjecting the surface of the sheet facing said surface to a sub-atmospheric pressure.

6. The method of claim 5, wherein the sub-atmospheric pressure is applied to locations adjacent the periphery of the sheet.

7. A process of forming a simulated stained glass article, comprising the steps of providing an injection molding die having a die cavity bordered by a die member, forming a series of interconnected recesses in a surface of the die member with said recesses bordering isolated areas of said surface, forming a series of randomly disposed surface indentations in said isolated areas, said surface indentations having a lesser depth than said recesses, printing a thin thermoplastic sheet with a colored pattern comprising a series of dark-colored interconnected strips bordering light colored zones, said strips having the same configuration as said recesses and said zones having the same configuration as said areas, positioning said sheet on said surface of the die member and registering said strips with said recesses and registering said zones with said areas, holding the sheet against the die member, injecting under pressure into said cavity a heated liquid resin compatible with said sheet, said sheet softening and deforming under said heat and pressure to deform the strips into the corresponding recesses and to deform said zones into the surface indentations of the corresponding areas, and fusing the resin to said sheet to provide a simulated stained glass article having raised dark colored strips bordering light colored areas.

8. The method of claim 7, wherein the step of holding the sheet against the die surface is accomplished by subjecting the surface of the sheet facing said surface to a sub-atmospheric pressure.

* * * * *

UNITED STATES PATENT AND TRADEMARK OFFICE
CERTIFICATE OF CORRECTION

PATENT NO. : 4,016,235
DATED : April 5, 1977
INVENTOR(S) : WILLIAM P. FERRO

It is certified that error appears in the above-identified patent and that said Letters Patent are hereby corrected as shown below:

Column 1, Line 55 Cance; "the" and substitute therefor ---The---

Column 4, Line 51, CLAIM 2 Cancel "dark", Column 4, Line 52

CLAIM 2, Cancel "light"

Signed and Sealed this

Sixth Day of September 1977

[SEAL]

Attest:

RUTH C. MASON
Attesting Officer

LUTRELLE F. PARKER
Acting Commissioner of Patents and Trademarks